United States Patent
Zinin et al.

(10) Patent No.: US 6,820,134 B1
(45) Date of Patent: Nov. 16, 2004

(54) OPTIMIZING FLOODING OF INFORMATION IN LINK-STATE ROUTING PROTOCOL

(75) Inventors: Alexey Dimitrievich Zinin, Cupertino, CA (US); Ian Michael Charles Shand, Cobham (GB)

(73) Assignee: Cisco Technology, Inc., San Jose, CA (US)

(*) Notice: Subject to any disclaimer, the term of this patent is extended or adjusted under 35 U.S.C. 154(b) by 798 days.

(21) Appl. No.: 09/749,858

(22) Filed: Dec. 28, 2000

(51) Int. Cl.⁷ .............................................. G06F 15/16
(52) U.S. Cl. ..................................... 709/238; 709/242
(58) Field of Search ................................ 709/238, 242

(56) References Cited

U.S. PATENT DOCUMENTS

| | | | |
|---|---|---|---|
| 5,754,547 A | * 5/1998 | Nakazawa | 370/401 |
| 6,553,423 B1 | * 4/2003 | Chen | 709/230 |
| 6,597,663 B1 | * 7/2003 | Rekhter | 370/252 |
| 6,683,865 B1 | * 1/2004 | Garcia-Luna-Aceves et al. | 370/349 |

OTHER PUBLICATIONS

Network Working Group. Internet Draft. Dan Dovolsky and Igor Bryskin, Virata Corporation. "Calculation of protection paths and proxy interfaces in optical networks using OSPF". Jun. 2000, pp 1–4.

Network Working Group. Internet Draft. Kireeti Kompella, Juniper Networks; Yakov Rekhter, Cisco Systems; and Lou Berger, LabN Consulting, LLC. "Link Building in MPLS Traffic Engineering". Jul. 2000, pp 1–7.

Network Working Group. J. Moy, Ascend Communications, Inc. "OSPF Version 2". Apr. 1998, pp 1–199.

The ATM Forum Technical Committee. Private Network—Network Interface Specification Version 1.0 (PNNI 1.0). Mar. 1996.

\* cited by examiner

*Primary Examiner*—Krisna Lim
(74) *Attorney, Agent, or Firm*—Cesari and McKenna, LLP

(57) ABSTRACT

A technique modifies an asynchronous flooding algorithm associated with a link state routing protocol operating within an area of a computer network from a per-interface to a per-neighbor paradigm. A router executes the flooding algorithm to distribute its local state over its interfaces and throughout an area of the network to each neighboring router with whom it has an adjacency. The router maintains a list of neighbors within an area data structure. When a new neighbor (adjacency) arises on an interface belonging to the area, the router updates the neighbor data structure describing that adjacency by linking it to a corresponding entry in the list of neighbors. Utilizing information contained in the list of neighbors, as well as information describing the types of interfaces used by the neighbors in the list, the router marks each interface data structure within the area as either flooding-active or flooding-passive. Marking of the interface is performed in connection with an interface election process that selects a flooding-active interface on the basis of, e.g., interface cost, giving preference to faster interfaces. Thereafter, link state protocol data units (PDUs) are sent to the neighbors over those interfaces marked as flooding-active.

25 Claims, 4 Drawing Sheets

OPTIMIZING FLOODING OF INFORMATION IN LINK-STATE ROUTING PROTOCOL

FIELD OF THE INVENTION

This invention relates generally to computer networks and, more particularly, to flooding algorithms associated with link state routing protocols used in a computer network.

BACKGROUND OF THE INVENTION

A computer network is a geographically distributed collection of interconnected communication links for transporting data between nodes, such as computers. Many types of computer networks are available, with the types ranging from local area networks (LANs) to wide area networks (WANs). The nodes typically communicate by exchanging discrete frames or packets of data according to pre-defined protocols. In this context, a protocol consists of a set of rules defining how the nodes interact with each other.

Computer networks may be further interconnected by an intermediate node, called a router, to extend the effective "size" of each network. Since management of a large system of interconnected computer networks can prove burdensome, smaller groups of computer networks may be maintained as autonomous systems or routing domains. The term routing domain is used by the International Organization for Standardization (ISO), whereas the term autonomous system is used by the Internet community and, in particular, the Internet protocol suite or IP.

The networks within an autonomous system or routing domain are typically coupled together by conventional intra-domain routers. These intradomain routers manage communication among local networks within their domains and communicate with each other using an intradomain routing protocol (ISO) or an Interior Gateway Protocol, IGP (IP). Examples of these protocols include the Intermediate System-to-Intermediate System, ISIS (ISO) and the Open Shortest Path First, OSPF (IP) routing protocols. The ISIS and OSPF protocols are based on link-state technology and, therefore, are hereinafter referred to as link state routing protocols.

In a link state routing protocol, each router maintains a database describing the topology of the routing domain or autonomous system (AS). This database is referred to as a link state database (LSDB) and each participating router has an identical LSDB. Each individual piece of the LSDB is a particular router's local state, e.g., the router's usable interfaces and reachable neighbors. As used herein, neighboring routers (or "neighbors") are two routers that have interfaces to a common network, wherein an interface is a connection between a router and one of its attached networks. Each router distributes its local state throughout the domain in accordance with an initial LSBD synchronization process and a conventional, asynchronous flooding algorithm.

The flooding algorithm is one of the most important parts of any link state routing protocol. The algorithm ensures that all routers within a link state domain converge on the same topological information within a finite period of time. To ensure reliability, typical implementations of the flooding algorithm send new information via all interfaces other than the one over which the new piece of information was received. Such redundancy is introduced to guarantee that flooding is performed reliably, but implies considerable overhead of utilized bandwidth and processor consumption (time) if neighboring routers are connected with more than one link.

In order to guarantee convergence of a link state routing protocol, it should be ensured that link state protocol data units (PDUs) that originate after an initial LSDB synchronization between neighbors is completed are delivered to all routers within the flooding scope limits. These limits may comprise an area or the entire AS, depending on the protocol and the type of link state PDU. An area is a collection or group of contiguous networks and nodes (hosts), together with routers having interfaces to any of the included networks. Each area runs a separate copy of the link state routing algorithm and, thus, has its own LSDB. In the case of OSPF, the PDU is a link state advertisement (LSA), whereas for ISIS, the PDU is a link state packet (LSP). The LSA/LSP is a unit of data describing the local state of a router or network; for a router, as noted, the state includes the state of the router's interfaces and adjacencies. An adjacency is a relationship formed between selected neighboring routers for the purpose of exchanging routing information and abstracting the network topology. One or more router adjacencies may be established over an interface. The collected PDUs of all routers and networks form the LSDB for the particular link state routing protocol.

Link state routing protocols typically use a per-interface paradigm for information flooding. Specifically, the model used by link state protocols to guarantee convergence implies that (i) PDUs are transmitted reliably between any pair of routers, and (ii) whenever a new PDU is received, it is sent over all interfaces other than the one over which it was received. An exception involves the case when the router is the Designated Router in OSPF, where the LSA is sent back over the same interfaces. To satisfy the first requirement, link state routing protocols keep retransmitting new PDUs to the neighbors that have not acknowledged reception (the only exception is flooding performed on broadcast links in ISIS). As an example, in OSPF, a link state retransmission list is maintained for every neighbor data structure on every interface. When an LSA is sent through an interface, it is placed on the retransmission list of every neighbor associated with this interface and is removed from it only after the neighbor has acknowledged reception of the LSA.

Similarly, ISIS implementations typically use Send Routing Message (SRMflag) and Send Sequence Number (SSNflag) flags that are interface-specific, as well as periodical Complete Sequence Numbers Packet (CSNP) announcements on broadcast links to ensure reliability of flooding. For each LSP, and for each interface (circuit) over which routing messages are exchanged, there is (i) a SRM-flag that, if set, indicates that the LSP should be transmitted on that circuit and (ii) a SSNflag that, if set, indicates that information about the LSP should be included in a Partial Sequence Number PDU (PSNP) transmitted on that circuit.

Although, the per-interface model works well, this approach implies high overhead in the case of highly redundant networks where neighboring routers are connected by more than one link. For example, assume two neighboring routers (R1 and R2) are connected via N links. When R1 receives new topological or routing information (in the form of PDUs) from a router other than R2, it installs the new PDU in its LSDB and performs the basic per-interface flooding algorithm, sending the new PDU over all interfaces except the one over which the new PDU was received. Therefore, R1 sends N copies of the new PDU to R2. R2 installs the first copy of the PDU it receives into its LSDB; however, link bandwidth and processor cycles are spent transmitting and processing all N copies of the PDU.

Furthermore, after installing the first copy of the PDU in its LSDB, R2 "floods back" to R1 N−1 copies of the PDU, again consuming substantial bandwidth and processor time. If R1 receives an acknowledgement from R2 on some links, but not from others, it keeps retransmitting unacknowledged PDUs even though they are already installed in R2's LDSB. The number of PDUs that are flooded in accordance with a link state routing protocol is quite large in conventional networks. Accordingly, the behavior of the per-interface paradigm inefficiently consumes (wastes) overhead in terms of bandwidth and processor resources. The present invention is directed to a technique that reduces the bandwidth and processor overhead consumed by a conventional flooding algorithm.

SUMMARY OF THE INVENTION

The present invention comprises a technique that modifies an asynchronous flooding algorithm associated with a link state routing protocol operating within an area of a computer network from a per-interface paradigm to a per-neighbor paradigm. A router executes the flooding algorithm to distribute its local state throughout the area by sending the state over its interfaces to each neighboring router with whom it has an adjacency. In the illustrative embodiment, the flooding algorithm may be defined in terms of its operation on various data structures. For example, a neighbor data structure defines each adjacency between the router and its neighbors, whereas an interface data structure is provided for each interface having a router adjacency. Moreover, an area data structure describes the operation of the link state routing protocol executing within the area to which the router is connected.

According to an aspect of the inventive technique, each router maintains a list of neighbors within the area data structure. When a new neighbor (adjacency) appears on an interface belonging to the area, the router updates the neighbor data structure describing that adjacency by linking it to a corresponding entry in the list of neighbors. Utilizing information contained in the list of neighbors, as well as information describing the types of interfaces used by the neighbors in the list, the router marks each interface data structure (and thus each corresponding interface) within the area as either flooding-active or flooding-passive. Marking of the interface is performed in connection with an interface election process that selects a flooding-active interface on the basis of, e.g., interface cost, giving preference to faster interfaces. Thereafter, link state protocol data units (PDUs) are sent to the neighbors over those interfaces marked as flooding-active, i.e., coupled to the "best" link(s). When the number of entries in the neighbor list changes or the states of the adjacencies in the list change, the router re-executes the interface election process.

If more than one best link is available, flooding to that neighbor may be performed using load balancing, i.e., different PDUs are sent along different links. Load balancing may also be performed through unequal-cost parallel links. Furthermore, multi-access interfaces are accorded preferential treatment if they are associated with more than one neighbor. For example, if an adjacency to a neighbor is realized through a broadcast interface, such as a local area network, and more than one neighbor is available on that interface, the interface is marked as flooding-active. This enables the router to deliver new PDUs to other routers over that same interface. However, if such an interface connects only two routers, it still may be marked as flooding-passive.

Since the novel technique changes the flooding algorithm from a per-interface to a per-neighbor model, PDU retransmission is not directed to a particular neighbor on a particular interface, but rather is directed solely to a particular neighbor. To that end, the inventive technique maintains a retransmission list on a per-neighbor basis, rather than on a per-neighbor-on-an-interface basis. The retransmission list is common for all adjacencies to a particular neighbor; therefore, delivery of new PDU information is guaranteed to the neighbor as long as there is at least one operational link to that neighbor. PDU delivery is guaranteed because the retransmission process is not tightly coupled to a particular adjacency, but instead is modified to use available flooding-active interfaces in response to, e.g., "firing" of a retransmission timer. It should be noted that it is sufficient for a router that transmits PDUs to receive a single acknowledgement on any interface in order to stop retransmitting the PDUs. The asynchronous flooding algorithm is thus modified to initially consider the area neighbor list and then use available physical interfaces to reliably deliver the PDUs to its neighbors.

According to another aspect of the present invention, the flooding algorithm is modified to avoid flooding of new information back to the neighbor that issued the information. In contrast, the conventional flooding algorithm only prevents flooding to the same neighbor through the same interface.

Advantageously, the novel flooding technique is optimized to reduce bandwidth and processor overhead caused by link state routing protocols (such as ISIS and OSPF), while allowing more effective use of available bandwidth to thereby improve the scalability of these protocols. For example, the inventive technique allows routers to "speed up" the adjacency establishment process in OSPF by taking advantage of the fact that a link state database (LSDB) loading process may be distributed among multiple links between adjacent routers. The novel technique also substantially speeds up network convergence since the amount of information sent over each link in order to synchronize the LSDBs may be apportioned among the number of flooding active adjacencies.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
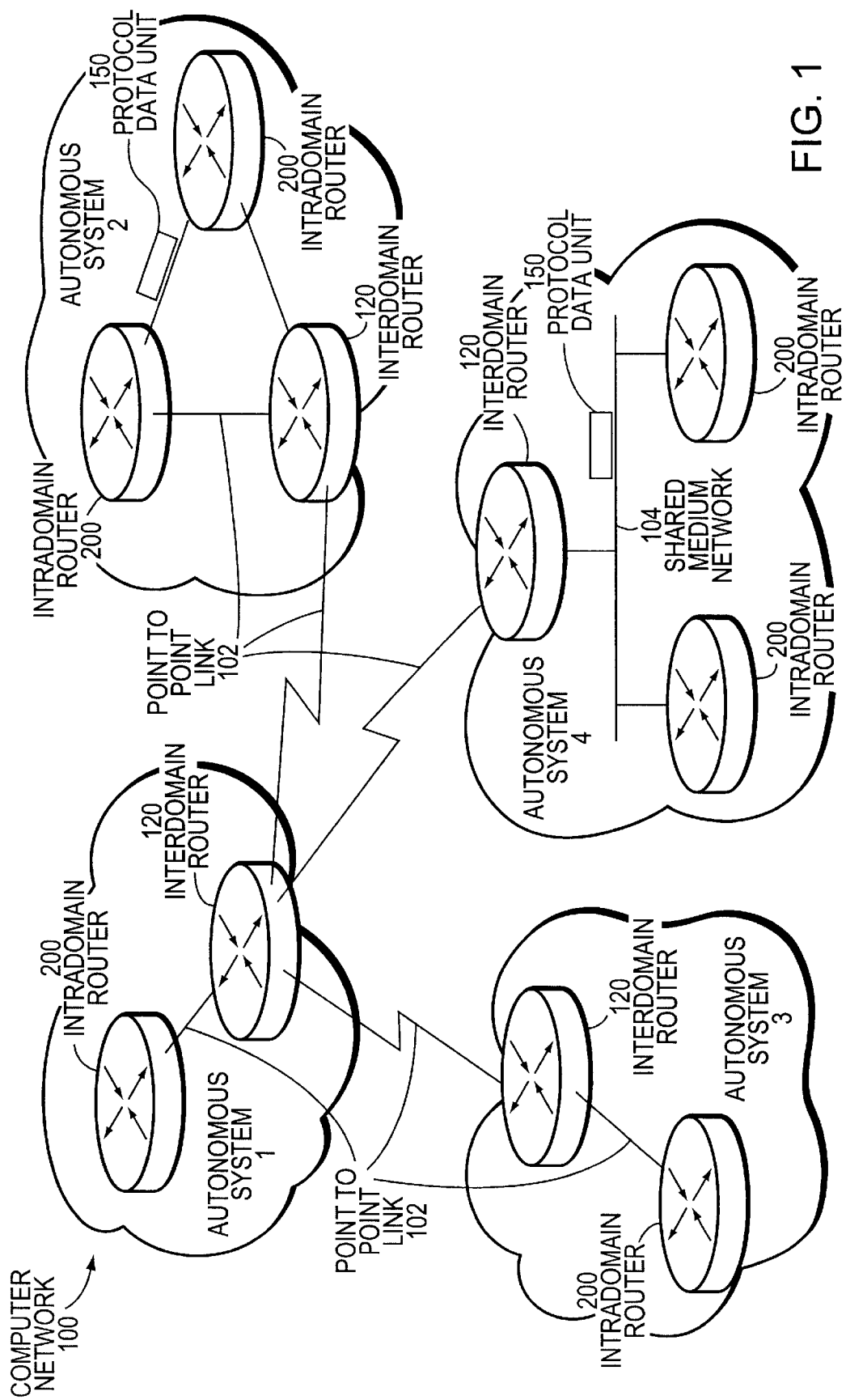
FIG. 1 is a schematic block diagram of a computer network comprising a plurality of autonomous systems or routing domains including intermediate nodes, such as intra-domain routers.

FIG. 1 is a schematic block diagram of a computer network 100 comprising a plurality of routing domains or autonomous systems interconnected by intermediate nodes, such as conventional interdomain routers 120 and intradomain routers 200. The interdomain routers 120 interconnect various autonomous systems (AS $_{1-4}$), whereas the intradomain routers 200 manage communication media and nodes within their respective AS domains. The communication media include shared medium networks 104, such as local area networks (LANs), point-to-point links 102 and non-broadcast multi-access (NBMA) clouds such as frame relay or asynchronous transfer mode networks. Communication among the routers is typically effected by exchanging discrete data units or packets in accordance with predefined protocols, such as the Transmission Control Protocol/Internet Protocol (TCP/IP). It will be understood to those skilled in the art that other protocols, such as the Internet Packet Exchange (IPX) protocol and associated link state routing protocols (e.g., NLSP), may be advantageously used with the present invention.

Figure 2:
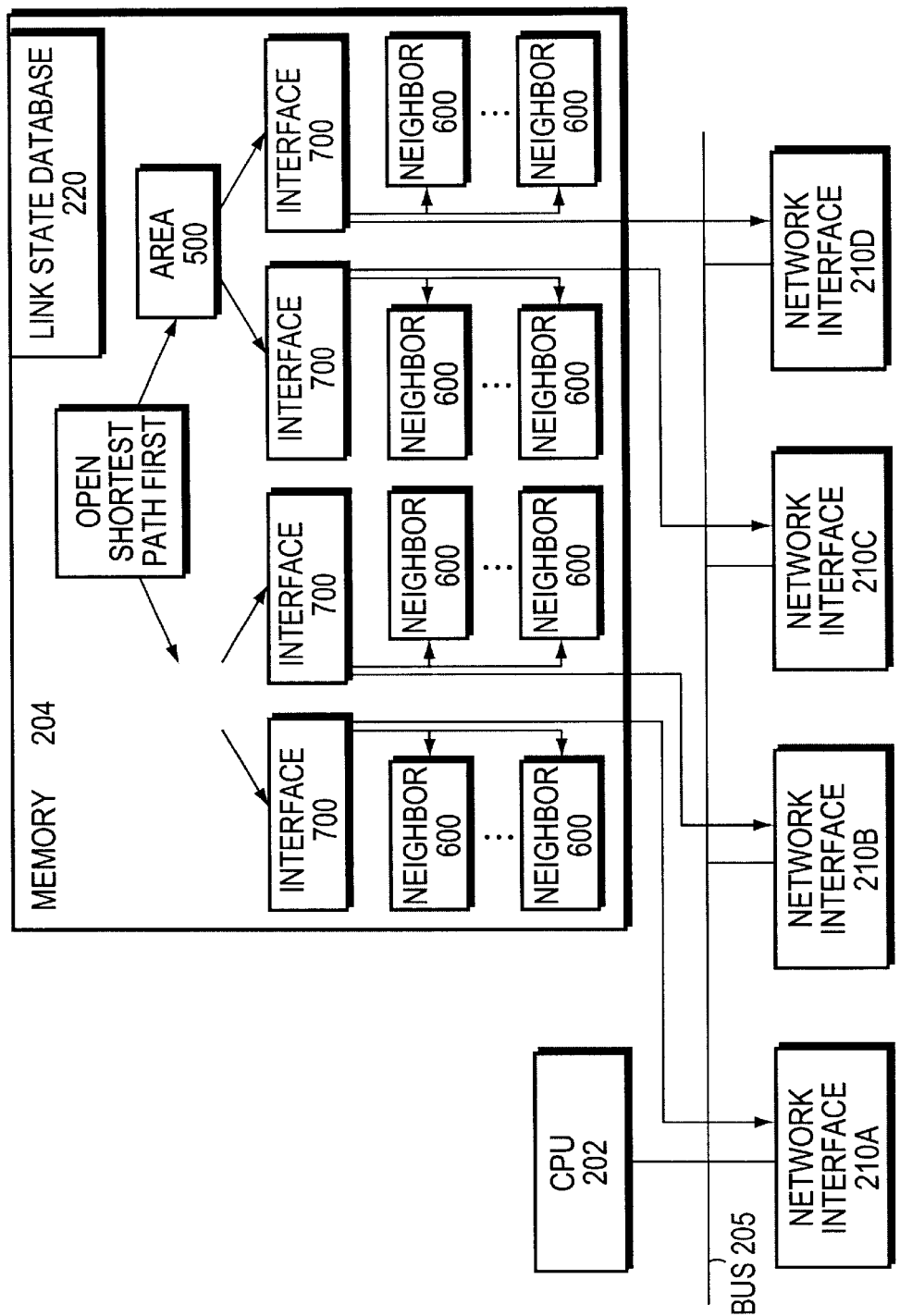
FIG. 2 is a schematic block diagram of a router, such as an intradomain router, comprising a central processor unit coupled to a memory and a plurality of network interfaces.

Each router typically comprises a plurality of interconnected elements, such as a processor, a memory and a network interface adapter. FIG. 2 is a schematic block diagram of a router, such as an intradomain router 200, comprising a central processor unit (CPU) 202 coupled to a memory 204 and a plurality of network interface adapters $210_{A-D}$ via a bus 205. The memory 204 may comprise storage locations addressable by the processor and interface adapters for storing software programs and data structures associated with the inventive flooding optimization mechanism and technique. The CPU 202 may comprise processing elements or logic for executing the software programs and manipulating (i.e., processing and maintaining) the data structures. An operating system, portions of which are typically resident in memory 204 and executed by the route processor, functionally organizes the router by, inter alia, invoking network operations in support of software processes executing on the router. It will be apparent to those skilled in the art that other processor and memory means, including various computer readable media, may be used for storing and executing program instructions pertaining to the inventive technique described herein.

Figure 3:
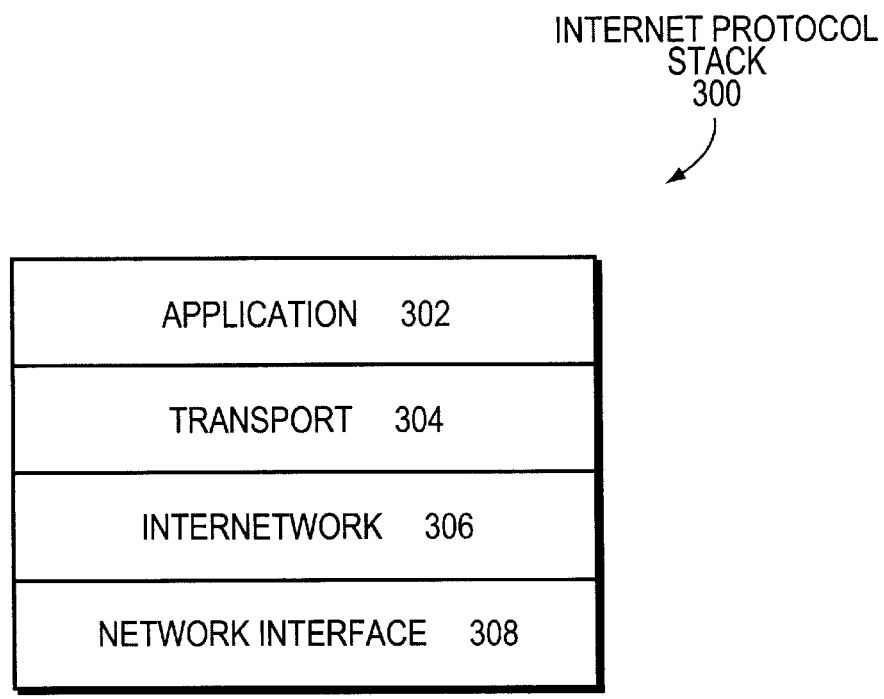
FIG. 3 is a schematic block diagram of a conventional protocol stack, such as the Internet communications protocol stack, within the intradomain router of FIG. 2.

A key function of the router is determining the next node to which a packet is sent; in order to accomplish such "routing", the intradomain routers 200 cooperate to determine optimal paths (i.e., "best links") through the computer network 100. The routing function is preferably performed by an internetwork layer of a conventional protocol stack within each router. FIG. 3 is a schematic block diagram of a conventional protocol stack, such as the Internet communications protocol stack 300. The architecture of the Internet protocol stack 300 is represented by four layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the Internet Protocol (IP). IP is primarily a connectionless protocol that provides for internetwork routing, fragmentation and reassembly of exchanged packets—generally referred to as "datagrams" in an Internet environment—and which relies on transport protocols for end-to-end reliability. An example of such a transport protocol is the Transmission Control Protocol (TCP) which is implemented by the transport layer and provides connection-oriented services to the upper layer protocols of the Internet architecture. The term TCP/IP is commonly used to denote the Internet architecture.

In particular, the internetwork layer 306 concerns the protocol and algorithms that intradomain routers 200 utilize so that they can cooperate to calculate paths through the computer network 100. An intradomain protocol, or Interior Gateway Protocol (IGP), may be used to perform intradomain routing (for the internetwork layer) within each AS of the computer network 100. Examples of protocols used to distribute routing information between neighboring routers belonging to a single AS include the Intermediate System-to-Intermediate System (ISIS) and the Open Shortest Path First (OSPF) link state routing protocols. The ISIS and OSPF routing protocols are well known and described in detail in Request for Comments (RFC) 1195 (Use of OSI IS—IS for Routing in TCP/IP and Dual Environments) by R. Callon (1990), ISO/IEC 10589:1992 Information technology—Telecommunications and information exchange between systems—Intermediate system to Intermediate system intra-domain routeing information exchange protocol for use in conjunction with the protocol for providing the connectionless-mode Network Service (ISO 8473), RFC 2328 (OSPF Version 2) by J. Moy (1998), and Interconnections, Second Edition by R. Perlman, published by Addison Wesley Publishing Co., (2000), each of which is hereby incorporated by reference.

In a link state routing protocol, each intradomain router maintains a link state database (LSDB 220, shown in FIG. 2) and each participating intradomain router has an identical LSDB. Each individual piece of the LSDB is a particular router's local state (e.g., the router's usable interfaces and reachable neighbors) that is distributed by the router throughout the AS in accordance with a flooding algorithm. The flooding algorithm ensures that all intradomain routers within a link state domain converge on the same topological information within a finite period of time. To ensure reliability, typical implementations of the flooding algorithm send new information in the form of protocol data units (PDUs) via all interfaces other than the one on which the new piece of information was received. Such redundancy is necessary to guarantee that flooding is performed reliably, but implies considerable overhead of utilized bandwidth and route processor time if neighboring routers are connected with more than one link.

Figure 4:
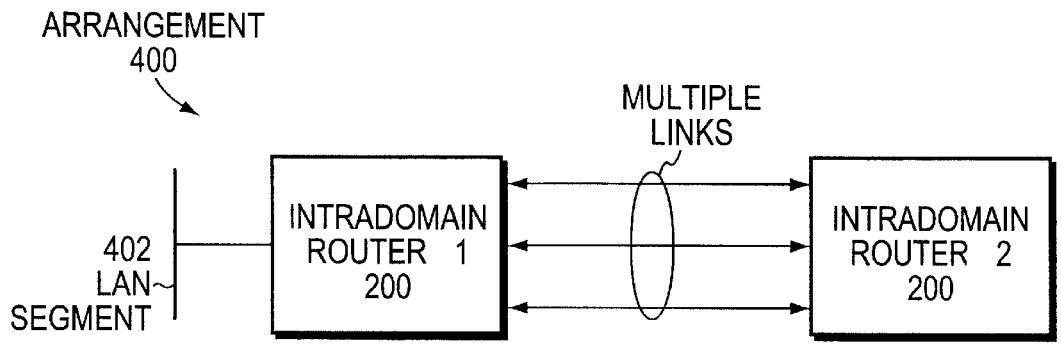
FIG. 4 is a schematic block diagram illustrating an arrangement wherein two intradomain routers are interconnected by multiple links.

FIG. 4 is a schematic block diagram illustrating an arrangement 400 wherein two intradomain routers 200 (R1 and R2) are interconnected by multiple links. When R1 receives a new PDU 150 (FIG. 1) from its LAN segment 402, it installs the PDU in its LSDB 220 and submits for flooding through all of its interfaces 210. Since flooding presumes sending the new PDU over all interfaces except for the one over which it was received, the routers typically perform the following actions:

1. R1 sends not one, but N copies of the new PDU to R2.
2. Only the first copy of the PDU is actually installed in R2's LSDB, but link bandwidth and processor cycles are spent transmitting and processing all N copies of the PDU.
3. Furthermore, when R2 receives the first copy of the PDU and installs it in the LSDB, it "floods back" N−1 copies of the PDU to R1, again spending extra bandwidth and processor time.

4. If R1 receives an acknowledgement from R2 on some links, but not from others, it keeps retransmitting unacknowledged PDUs even though they are already in R2's LSDB.

The present invention provides a technique for minimizing overhead created by a link state routing protocol in the above situation, while enabling more efficient use of link bandwidth. Specifically, the technique modifies a conventional asynchronous flooding algorithm from a per-interface paradigm to a per-neighbor paradigm in a backward compatible manner. A router executes the flooding algorithm to distribute its local state over its interfaces and throughout an area of the network to each neighboring router with whom it has an adjacency. The novel technique may apply to any protocol utilizing reliable flooding. Notably, the inventive technique is based on the observation that the ultimate goal of the flooding algorithm is not to send link state PDUs over all interfaces, but to deliver them to all adjacent routers within respective area domains of the network.

In the illustrative embodiment, the flooding algorithm and its associated link state routing protocol may be defined in terms of its operation on various data structures. For example in the case of OSPF, the PDU is a link state advertisement (LSA), whereas for ISIS, the PDU is a link state packet (LSP). In addition, a neighbor data structure defines each adjacency between the router and its neighbors, whereas an interface data structure is provided for each interface having a router adjacency. Moreover, an area data structure describes the operation of the link state routing protocol executing within an area to which the router is connected.

According to an aspect of the inventive technique, each router maintains a list of neighbors within the area data structure. When a new neighbor (adjacency) appears (i.e., is discovered by the router) on an interface belonging to the area, the router updates the neighbor data structure describing that adjacency by linking it to a corresponding entry in the list of neighbors. Utilizing information contained in the list of neighbors, as well as information describing the types of interfaces used by the neighbors in the list, the router marks each interface data structure (and thus each corresponding interface) within the area as either flooding-active or flooding-passive. Marking of the interface is performed in connection with an interface election process that selects a flooding-active interface on the basis of, e.g., interface cost, giving preference to faster interfaces. Thereafter, link state PDUs are sent to the neighbors over those interfaces marked as flooding-active, i.e., coupled to the "best" link(s). When the number of entries in the neighbor list changes or the states of the adjacencies in the list change, the router re-executes the interface election process.

If more than one best link is available, flooding to that neighbor may be performed using load-balancing, i.e., different PDUs are sent along different links. Load balancing may also be performed through unequal-cost parallel links. Furthermore, multi-access interfaces may be accorded preferential treatment since they may be associated with more than one neighbor. For example, if an adjacency to a neighbor is realized through a broadcast interface, such as a local area network, and more than one neighbor is available on that interface, the interface may be marked as flooding-active. This enables the router to deliver new PDUs to other routers over that same interface. However, if such an interface connects only two routers, it still may be marked as flooding-passive.

Since the novel technique changes the flooding algorithm from a per-interface to a per-neighbor model, PDU retransmission is not directed to a particular neighbor on a particular interface, but rather is directed solely to a particular neighbor. To that end, the inventive technique maintains a retransmission list on a per-neighbor basis, rather than on a per-neighbor-on-an-interface basis. The retransmission list is common for all adjacencies to a particular neighbor; therefore, delivery of new PDU information is guaranteed to the neighbor as long as there is at least one operational link to that neighbor. PDU delivery is guaranteed because the retransmission process is not tightly coupled to a particular adjacency, but instead is modified to use available flooding-active interfaces in response to, e.g, "firing" of a retransmission timer.

According to another aspect of the present invention, the flooding algorithm is modified to obviate flooding of new information back to the neighbor that issued the information. In contrast, the conventional flooding algorithm only prevents flooding to the same neighbor through the same interface. Specifically, it is sufficient for a router 200 that transmits PDUs to receive a single acknowledgement on any interface 210 in order to stop retransmitting the PDUs 150. The asynchronous flooding algorithm is thus modified to initially consider the area neighbor list and then use available physical interfaces 210 to reliably deliver the PDUs to its neighbors.

The initial process of LSDB synchronization is also modified to take advantage of multiple links. If more than one adjacency is "coming up" between two routers simultaneously, the router may "speed up" the adjacency establishment process by distributing the PDU (LSA) loading process among multiple links between adjacent routers. This enhancement speeds up the announcement of links that come up, since the OSPF protocol "announces" an adjacency only when it reaches Full state, i.e., when routers have synchronized their LSDBs.

To illustrate the benefit of the novel technique, consider the situation where R1 (FIG. 4) has 100 PDUs to flood to R2, and N=3. Without the novel optimization technique, there would be:

300 copies of PDUs going from R1 to R2

300 LSDB lookup operations performed by R2

300 acknowledgements coming back from R2

300 lookup operations on the retransmit list or LSDB by R1 to remove acknowledged PDUs 200 copies of PDUs coming back from R2 to R1

200 LSDB lookup operations performed by R1

200 acknowledgements going from R1 to R2, and 200 lookup operations on the retransmit list or LSDB by R2 to remove acknowledged PDUs.

In contrast, implementation of the novel technique results in:

100 copies of PDUs going from R1 to R2, possibly over different interfaces for faster transmission 100 LSDB lookup operations performed by R2

100 acknowledgments coming back from R2

100 lookup operations on the retransmit list or LSDB by R1 to remove acknowledged PDUs no (0) copies of PDUs coming back from R2 to R1 no (0) LSDB lookup operations performed by R1 no (0) acknowledgements going from R1 to R2, and no (0) lookup operations on the retransmit list or LSDB by R2 to remove acknowledged PDUs.

Figure 5:
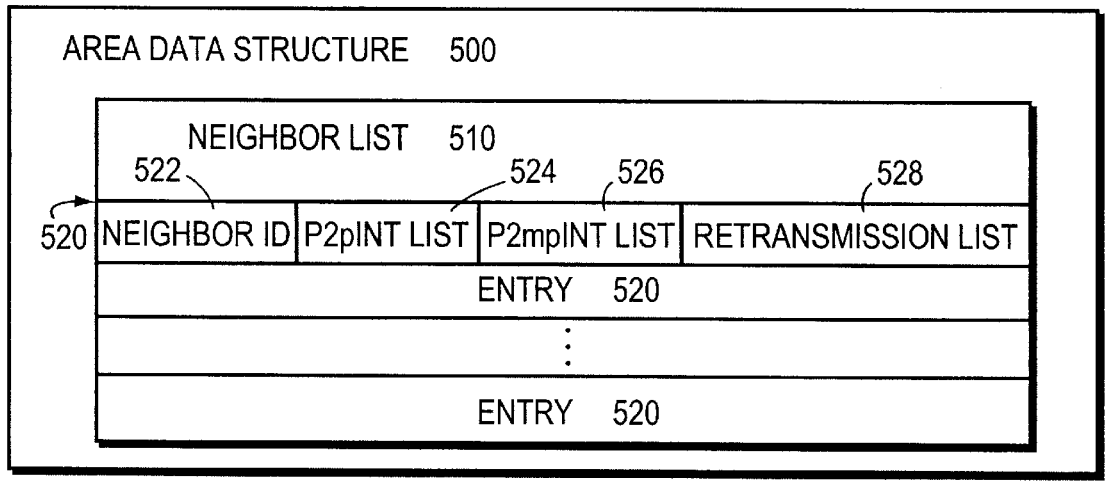
FIG. 5 is a schematic block diagram illustrating a NeighborList field of an area data structure in accordance with the present invention.

In accordance with another aspect of the invention, modifications to the various data structures used in the link state routing protocols are needed to implement the novel technique and mechanism described herein. For example in the case of OSPF, a new field is introduced to the area data structure, called the NeighborList. FIG. 5 is a schematic block diagram illustrating the new field 510 of the area data structure 500. NeighborList 510 comprises a list of entries, wherein each entry 520 is created when a first neighbor data structure for the neighbor with a particular router ID is created within an area. Each neighbor list entry 520 contains the following fields:

NeighborID 522—the router identification (ID) of the neighbor connected with the calculating router with one or more interfaces.

P2pIntList 524—list of interfaces that have only one fully established adjacency and is established with the neighbor identified by the NeighborID 522 (point-to-point and virtual links, as well as broadcast and non-broadcast, multiple access (NBMA) interfaces connecting only two routers).

P2mpIntList 526—list of interfaces that have more than one fully established adjacency and one of them is established with the neighbor identified by the NeighborID 522 (NBMA and broadcast networks).

Retransmission List 528— list of LSAs that must be delivered to the remote router using available physical interfaces.

It should be noted that when a neighbor is reachable over multiple interfaces, there will be more than one entry in the above list of interfaces.

Figure 6:
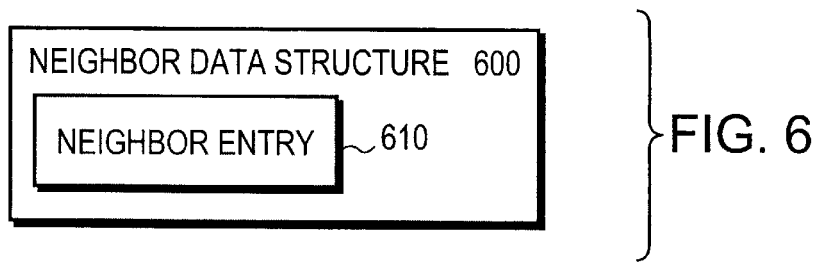
FIG. 6 is a schematic block diagram illustrating a NeighborEntry field of a neighbor data structure in accordance with the present invention.

In addition, a new field is introduced to an interface-specific neighbor data structure: the NeighborEntry. FIG. 6 is a schematic block diagram illustrating the new NeighborEntry field 610 of the neighbor data structure 600. When an instance of the interface-specific neighbor data structure 600 is created, the content of the NeighborEntry field 610 is set to reference a corresponding entry 520 in the area NeighborList 510. When a neighbor data structure 600 is created for an interface, the P2pIntList 524 and the P2mpIntList 526 of area data structures 500 corresponding to the neighbors reachable through the same interface are modified. If only one neighbor data structure 600 is available for the interface, the interface is placed on the P2pIntList 524 for that neighbor. Otherwise, if more than one neighbor is known (regardless of the states of the neighbors), the interface is placed on the P2mpIntLists 526 of all neighbors reachable through interface. It should be noted that point-to-point interfaces may temporarily have more than one neighbor linked to an interface data structure when the router ID of the neighbor changes. The modified algorithm handles such transition states by temporarily placing the interface on the P2mpIntList 526.

Figure 7:
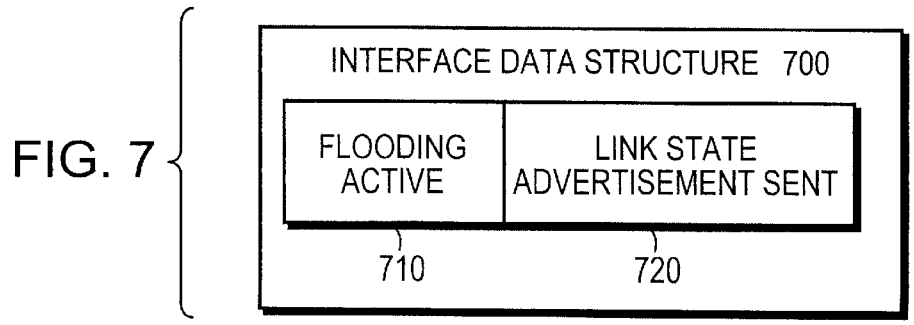
FIG. 7 is a schematic block diagram illustrating a FloodingActive field and LSASent field of an interface data structure in accordance with the present invention.

In accordance with yet another aspect of the present invention, two new fields are provided to the interface data structure: a FloodingActive field and a LSASent field. FIG. 7 is a schematic block diagram illustrating the new FloodingActive field 710 and LSASent field 720 of the interface data structure 700. If the value of the FloodingActive field 710 is TRUE, the interface is used for flooding. Otherwise the interface is flooding-passive and no LSAs are sent over it when asynchronous flooding is performed. When an interface is placed on the P2mpIntList 526 of an area data structure 500, its FloodingActive field 710 is always set to TRUE. The FloodingActive field is generally consulted only if the interface is listed in a P2pIntList 524. The LSASent field 720 is used by the flooding procedure described further herein.

When there is a change in the contents of the P2pIntList 524 or P2mpIntList 526 of an area neighbor data structure, the router performs election of flooding-active interfaces among the interfaces listed in the P2pIntList field 524. The election process algorithm, described below, preferably produces a minimal set of active interfaces. For every entry 520 in the area NeighborList 510, the following actions are performed:

1. If the P2mpIntList 526 is not empty, examine all interfaces in the P2pIntList 524 and mark them flooding-passive by setting the FloodingActive field 710 to FALSE. Note that it is always preferable to send LSAs to multiple neighbors simultaneously.

2. Otherwise, among the interfaces in the P2pIntList 524, set the FloodingActive field 710 to TRUE for those interfaces that have the best interface cost. Set the FloodingActive field 710 to FALSE for all other interfaces in the list.

Some implementations may maintain a single link state request list per neighbor in an area. This may be used to divide the loading process among several links when more than one adjacency is coming up simultaneously. In this case, when the link state request list for a particular neighbor becomes empty, a LoadingDone event is generated for all adjacencies with this neighbor that are currently in the Loading state.

In accordance with yet another aspect of the present invention, the asynchronous flooding algorithm is modified as follows. Note the following changes do not affect flooding back to a multi-access interface if the router is the Designated Router. The changes are only in the portion of the algorithm where the LSA is sent over interfaces. Specifically, if the flooding scope is domain-wide, perform the following for all areas. If the flooding scope is area-wide, perform the following steps only for the area to which the interface where the LSA was received belongs. Consider every neighbor element in the area neighbor list as follows:

1. If the value of the NeighborID field 522 is equal to the router ID of the neighbor that sent the LSA to the router, consider the next neighbor element (there is no need to send the LSA back to the sending router, except for the case when the receiving router is the designated router and the LSA is flooded back to a multi-access interface).

2. If the P2mpIntList is empty, go to step 3. Otherwise perform the following steps:

(a) Place the LSA on the neighbor's retransmission list 528.

(b) Examine every interface on the P2mpIntList 526 and perform the following:

Compare the LSA being flooded with the one identified by the LSASent field 720 of the interface data structure 700. If the LSAs are the same, the LSA has already been sent on this interface and the next interface in the P2mpIntList 526 must be considered.

Send the LSA in a link state update packet setting the destination address according to the rules in Section 13 of the RFC 2328.

Set the LSASent field 720 of the interface data structure 700 to the LSA that has just been sent.

(c) Consider the next neighbor element in the area NeighborList 510. That is, skip flooding over the interfaces in the P2pIntList 524.

3. If the P2pIntList 524 is empty, consider the next neighbor element. Otherwise:

(a) Place the LSA on a neighbor's retransmission list 528.

(b) Examine every interface on the P2pIntList 524 and perform the following:

If the interface FloodingActive field 710 is clear, skip this interface and consider the next interface in the list.

Send the LSA in a link state update packet setting the destination address according to the rules in Section 13 of RFC 2328.

(c) Consider the next neighbor element in the area neighbor list.

According to the novel technique, reception of OSPF acknowledgements is modified as follows. When a link state acknowledgement is received from a neighbor, the corresponding entry 520 in the area NeighborList 510 is located and the corresponding LSA is removed from the retransmission list 528.

The OSPF implementation is also modified to perform retransmission of LSAs on a per-neighbor basis. Typically, the interfaces for LSA retransmission are selected according to the rules used for asynchronous LSA flooding. However, implementations may consider retransmitting LSAs over a larger set of interfaces leading to the neighbor if the minimal interface set is suspected to be insufficient (due to link load or packet drops) to complete LSDB synchronization within a reasonable period of time. Note that when retransmitting the LSAs to the neighbors, routers do not consult the LSASent field.

It will be apparent to those skilled in the art that the optimizations for OSPF link state routing protocol described above are intended to be backward compatible. To that end, no software modification is necessary for the neighboring routers. However, if both adjacent routers support the described modifications, increased benefits should be realized.

While there has been shown and described an illustrative embodiment for modifying an asynchronous flooding algorithm associated with a link state routing protocol used in a computer network from a per-interface to per-neighbor basis, it is to be understood that various other adaptations and modifications may be made within the spirit and scope of the invention. For example in another embodiment, modifications to the ISIS protocol are generally similar to those for OSPF. Specifically, each non-broadcast interface (circuit) has associated with it a system ID of the neighbor that is adjacent over that circuit. At each of level 1 and level 2, the set of one or more circuits with an adjacency at that level and a common neighbor is identified as a group. Send Routing Message flags (SRMflags) are associated with groups rather than circuits. The SSNflags remain associated with circuits.

The ISO/IEC 10589 described the setting or clearing of the SRMflag or Send Sequence Number flag (SSNflag) on a non-broadcast circuit for the following reasons:

1. The SSNflag is cleared after the transmission of a Partial Sequence Number PDU (PSNP) over circuit C.
2. A packet has been received on circuit C and a flag on circuit C is set or cleared as a result.
3. A packet has been received on circuit C and the flags on all other circuits are set or cleared as a result.
4. The flags on all circuits are set or cleared.

These actions are modified as described below. In these descriptions, the term Sxxflag refers to either SSNflag or SRMflag.

1. The SSNflag is cleared after the transmission of a PSNP over circuit C. Clear the flag on circuit C.
2. A packet has been received on circuit C and an Sxxflag on circuit C is to be set or cleared as a result. Circuit C is a member of group G.
   a. If an SSNflag is to be cleared, clear all SSNflags for circuits in group G.
   b. If an SRMflag is to be cleared, clear the SRMflag for group G.
   c. If an SSNflag is to be set, set the SSNflag for circuit C only.
   d. If an SRMflag is to be set, set the SRMflag for group G.
3. A packet has been received on circuit C and the Sxxflags on all other circuits are to be set or cleared as a result. Circuit C is a member of group G.
   a. If an SSNflag is to be cleared, clear all SSNflags for all circuits belonging to groups other than G.
   b. If an SRMflag is to be cleared, clear all SRMflags for groups other than G.
   c. If an SRMflag is to be set, set all SRMflags for groups other than G.
4. The flags on all circuits are set or cleared.
   a. If an SSNflag is to be cleared, clear all SSNflag for all circuits.
   b. If an SRMflag is to be cleared, clear SRMflags for all groups.
   c. If an SRMflag is to be set, set SRMflags for all groups.
5. Transmitting an LSP as a result of SRMflags being set on Group G. Choose one circuit from group G and transmit the LSP over that circuit.

Where a circuit is required to be chosen from within the group, the choice made is implementation dependent and may be based on any criteria, such as bandwidth or management control. The result of the choice may be different on each occasion. Implementation may also decide to choose no point-to-point links if a neighboring system is available via a broadcast circuit since LSPs need to be flooded through it anyway. It is also possible to treat broadcast circuits with only two routers attached as point-to-point circuits. It should be noted that IS—IS routers should treat the links as point-to-point on both sides; accordingly, this may require explicit configuration by an administrator.

Advantageously, the novel flooding technique described herein is optimized to reduce bandwidth and processor overhead caused by link state routing protocols (such as ISIS and OSPF), while allowing more effective use of available bandwidth to thereby improve the scalability of these protocols. For example, the inventive technique allows routers to "speed up" the adjacency establishment process in OSPF by taking advantage of the fact that the LSDB loading process may be distributed among multiple links. The novel technique also substantially speeds up network convergence since the amount of information sent over each link in order to synchronize the LSDBs may be apportioned among the number of flooding active adjacencies.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for modifying an asynchronous flooding algorithm executed by a router of a computer network and associated with a link state routing protocol operating within an area of the network, the flooding algorithm modified from a per-interface paradigm to a per-neighbor paradigm, the method comprising the steps of:

maintaining a list of neighbors within an area data structure of the router, the list of neighbors having a plurality of entries;

updating a neighbor data structure of the router when a neighbor appears on an interface of the router belonging to the area, the neighbor data structure describing an adjacency between the router and a neighboring router;

marking an interface data structure of the router as one of flooding-active and flooding-passive, the interface data structure provided for each interface having a router adjacency; and sending link state protocol data units (PDUs) to the neighbor over the interface if the interface data structure is marked flooding-active.

2. The method of claim 1 wherein the step of sending comprises the step of obviating flooding of the PDUs back to the router via any interface.

3. The method of claim 1 wherein the step of sending comprises the step of retransmitting PDUs to the neighbor until a single acknowledgement is received over any interface.

4. The method of claim 1 wherein the step of updating comprises the step of linking the neighbor data structure to a corresponding entry in the list of neighbors.

5. The method of claim 4 wherein the step of marking comprises the step of selecting a flooding-active interface on the basis of interface cost, giving preference to faster interfaces.

6. The method of claim 5 wherein the step of selecting is performed in connection with an interface election process executed by the router.

7. The method of claim 6 further comprising the step of re-executing the interface election process when one of a number of entries in the list of neighbors changes and a state of the adjacency in the list changes.

8. The method of claim 1 further comprising the step of distributing a PDU loading process among multiple links between adjacent routers when more than one adjacency simultaneously arises between two routers.

9. Apparatus for modifying an asynchronous flooding algorithm executed by an intermediate device of a computer network and associated with a link state routing protocol operating within an area of the network, the flooding algorithm modified from a per-interface paradigm to a per-neighbor paradigm, the apparatus comprising:

means for maintaining a list of neighbors within an area data structure of the intermediate device, the list of neighbors having a plurality of entries;

means for updating a neighbor data structure of the intermediate device when a new neighbor appears on an interface of the device belonging to the area, the neighbor data structure describing an adjacency between the intermediate device and a neighboring intermediate device;

means for marking an interface data structure of the intermediate device as one of flooding-active and flooding-passive, the interface data structure provided for each interface having an intermediate device adjacency; and means for sending link state protocol data units (PDUs) to the new neighbor over the interface if the interface data structure is marked flooding-active.

10. The apparatus of claim 9 wherein the updating means comprises means for linking the neighbor data structure to a corresponding entry in the list of neighbors.

11. The apparatus of claim 10 wherein the marking means comprises means for selecting a flooding-active interface on the basis of interface cost, giving preference to faster interfaces.

12. The apparatus of claim 11 further comprising means for executing an interface election process when one of a number of entries in the list of neighbors changes and a state of the adjacency in the list changes.

13. The apparatus of claim 9 wherein the intermediate device is a router.

14. A computer readable medium containing executable program instructions for modifying an asynchronous flooding algorithm executed by a router of a computer network and associated with a link state routing protocol operating within an area of the network, the flooding algorithm modified from a per-interface paradigm to a per-neighbor paradigm, the executable program instructions comprising program instructions for:

maintaining a list of neighbors within an area data structure of the router, the list of neighbors having a plurality of entries;

updating a neighbor data structure of the router when a new neighbor appears on an interface of the router belonging to the area, the neighbor data structure describing an adjacency between the router and a neighboring router;

marking an interface data structure of the router as one of flooding-active and flooding-passive, the interface data structure provided for each interface having a router adjacency; and sending link state protocol data units (PDUs) to the new neighbor over the interface if the interface data structure is marked flooding-active.

15. The computer readable medium of claim 14 wherein the program instruction for updating comprises the program instruction for linking the neighbor data structure to a corresponding entry in the list of neighbors.

16. The computer readable medium of claim 15 wherein the program instruction for marking comprises the program instruction for selecting a flooding-active interface on the basis of interface cost, giving preference to faster interfaces.

17. The computer readable medium of claim 16 wherein the program instruction for selecting is performed in connection with an interface election process executed by the router.

18. The computer readable medium of claim 17 further comprising a program instruction for re-executing the interface election process when one of a number of entries in the list of neighbors changes and a state of the adjacency in the list changes.

19. A memory for storing software programs and data structures associated with an asynchronous flooding algorithm of a link state routing protocol executed by a router within an area of a computer network, the flooding algorithm defined by operation on the data structures comprising:

an area data structure containing a list of neighbors, the list of neighbors having a plurality of entries;

a neighbor data structure describing an adjacency between the router and a neighboring router, the neighbor data structure updated by the router when a new neighbor appears on an interface of the router belonging to the area;

an interface data structure provided for each interface having a router adjacency, the interface data structure marked by the router as one of flooding-active and flooding-passive; and link state protocol data units (PDUs) transmitted by the router to the new neighbor over the interface if the interface data structure is marked flooding-active.

20. The memory of claim 19 wherein the list of neighbors comprises a NeighborList field having a list of entries, each entry created when a first neighbor data structure for the new neighbor is created within the area.

21. The memory of claim 20 wherein the neighbor data structure comprises a NeighborEntry field having a content set to reference a corresponding entry in the NeighborList when an instance of the neighbor data structure is created.

22. The memory of claim 21 wherein the interface data structure comprises a FloodingActive field and wherein the interface corresponding to the interface data structure is used for flooding if a value of the FloodingActive field is true.

23. The memory of claim 19 wherein the PDUs are one of link state advertisements (LSAs) and link state packets (LSP).

24. Apparatus for modifying an asynchronous flooding algorithm executed by an intermediate device of a computer network and associated with a link state routing protocol operating within an area of the network, the flooding algorithm modified from a per-interface paradigm to a per-neighbor paradigm, the apparatus comprising:

a memory configured to store a link state database describing a local state of the intermediate device; and a processor coupled to the memory, the processor adapted to execute the modified flooding algorithm to distribute the local state to all adjacent intermediate devices within the area of the network rather than distributing the local state over all interfaces of the intermediate device.

25. The apparatus of claim 24 wherein the intermediate device is a router.

* * * * *